United States Patent
Kim et al.

(10) Patent No.: US 10,713,808 B2
(45) Date of Patent: Jul. 14, 2020

(54) STEREO MATCHING METHOD AND SYSTEM USING RECTANGULAR WINDOW

(71) Applicants: ELECTRONICS AND TELECOMMUNICATIONS RESEARCH INSTITUTE, Daejeon (KR); KYUNGPOOK NATIONAL UNIVERSITY INDUSTRY—ACADEMIC COOPERATION FOUNDATION, Daegu (KR)

(72) Inventors: Kwang Yong Kim, Daegu (KR); Byungin Moon, Daegu (KR); Mi-ryong Park, Sejong-si (KR); Kyeong-ryeol Bae, Daegu (KR)

(73) Assignees: ELECTRONICS AND TELECOMMUNICATIONS RESEARCH INSTITUTE, Daejeon (KR); KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 241 days.

(21) Appl. No.: 15/793,528

(22) Filed: Oct. 25, 2017

(65) Prior Publication Data

US 2018/0130221 A1 May 10, 2018

(30) Foreign Application Priority Data

Nov. 8, 2016 (KR) ........................ 10-2016-0148300

(51) Int. Cl.
*G06T 7/62* (2017.01)
*G06T 1/60* (2006.01)
(Continued)

(52) U.S. Cl.
CPC ............... *G06T 7/62* (2017.01); *G06T 1/60* (2013.01); *G06T 5/006* (2013.01); *G06T 5/50* (2013.01);
(Continued)

(58) Field of Classification Search
CPC ... G06T 7/62; G06T 7/11; G06T 7/174; G06T 7/593; G06T 1/60; G06T 5/006; G06T 5/50
See application file for complete search history.

(56) References Cited

U.S. PATENT DOCUMENTS

| 6,026,358 | A  | * | 2/2000 | Tomabechi | G10L 15/16 704/232 |
| 6,215,898 | B1 | * | 4/2001 | Woodfill | G06K 9/32 382/154 |

(Continued)

FOREIGN PATENT DOCUMENTS

KR   10-0813100   3/2008

OTHER PUBLICATIONS

S. Jin et al., FPGA Design and Implementation of a Real-Time Stereo Vision System, IEEE Transactions on Circuits and Systems for Video Technology, vol. 20, No. 1, Jan. 2010, pp. 15-26.

*Primary Examiner* — Mia M Thomas
(74) *Attorney, Agent, or Firm* — Staas & Halsey LLP (57) ABSTRACT

Disclosed is a stereo matching method and apparatus based on a stereo vision, the method including acquiring a left image and a right image, identifying image data by applying a window to each of the acquired left image and right image, storing the image data in a line buffer, extracting a disparity from the image data stored in the line buffer, and generating a depth map based on the extracted disparity.

13 Claims, 10 Drawing Sheets

(51) Int. Cl.
*G06T 7/593* (2017.01)
*G06T 7/11* (2017.01)
*G06T 7/174* (2017.01)
*G06T 5/00* (2006.01)
*G06T 5/50* (2006.01)

(52) U.S. Cl.
CPC ............... *G06T 7/11* (2017.01); *G06T 7/174* (2017.01); *G06T 7/593* (2017.01); *G06T 2200/28* (2013.01); *G06T 2207/20021* (2013.01)

(56) References Cited

U.S. PATENT DOCUMENTS

| | | | | |
|---|---|---|---|---|
| 6,728,391 | B1* | 4/2004 | Wu | B07C 1/00 209/583 |
| 7,538,783 | B2* | 5/2009 | MacInnis | G06T 9/00 345/530 |
| 8,284,209 | B2* | 10/2012 | Neuman | H04N 7/0122 345/530 |
| 8,787,656 | B2* | 7/2014 | Park | G06T 7/593 382/154 |
| 2004/0190092 | A1* | 9/2004 | Silverbrook | G06F 3/03545 358/539 |
| 2005/0100207 | A1* | 5/2005 | Konolige | G06T 7/20 382/154 |
| 2006/0277038 | A1* | 12/2006 | Vos | G10L 19/0208 704/219 |
| 2007/0025560 | A1* | 2/2007 | Asada | G10K 15/12 381/61 |
| 2007/0147671 | A1* | 6/2007 | Di Vincenzo | H04N 13/111 382/128 |
| 2009/0324059 | A1* | 12/2009 | Boughorbel | G06T 7/55 382/154 |
| 2010/0085383 | A1* | 4/2010 | Cohen | G06T 3/40 345/660 |
| 2012/0075535 | A1* | 3/2012 | Van Beek | H04N 5/145 348/699 |
| 2013/0016898 | A1* | 1/2013 | Tchoukaleysky | H04N 19/597 382/154 |
| 2013/0176401 | A1* | 7/2013 | Monari | H04N 5/2252 348/47 |
| 2013/0208093 | A1* | 8/2013 | Sun | G06T 5/003 348/46 |
| 2014/0177927 | A1* | 6/2014 | Shieh | G06T 7/593 382/108 |
| 2014/0241612 | A1* | 8/2014 | Rhemann | G06T 7/521 382/154 |
| 2015/0235450 | A1* | 8/2015 | Schowengerdt | G06F 3/012 345/633 |
| 2015/0294160 | A1* | 10/2015 | Takahashi | G06K 9/00791 382/104 |
| 2015/0348246 | A1* | 12/2015 | Lim | G06T 5/001 382/167 |
| 2016/0014406 | A1* | 1/2016 | Takahashi | G06T 7/73 348/148 |
| 2016/0353082 | A1* | 12/2016 | Pitts | H04N 13/232 |
| 2018/0130221 | A1* | 5/2018 | Kim | G06T 7/62 |
| 2018/0262744 | A1* | 9/2018 | Tadi | H04N 13/271 |

* cited by examiner

<Census transform>

| 142 | 152 | 125 | 142 | 153 |
|---|---|---|---|---|
| 124 | 153 | 163 | 124 | 132 |
| 158 | 163 | 135 | 134 | 126 |
| 105 | 172 | 153 | 152 | 163 |
| 100 | 124 | 164 | 182 | 117 |

⇒

| 0 | 0 | 1 | 0 | 0 |
|---|---|---|---|---|
| 1 | 0 | 0 | 1 | 1 |
| 0 | 0 |  | 1 | 1 |
| 1 | 0 | 0 | 0 | 0 |
| 1 | 1 | 0 | 0 | 1 |

Hamming weight = 0010010011001110000 11001

FIG. 2B

<Vertical census transform>

| 142 | 152 | 125 | 142 | 153 |
|---|---|---|---|---|
| 124 | 153 | 163 | 124 | 132 |
| 158 | 163 | 135 | 134 | 126 |
| 105 | 172 | 153 | 152 | 163 |
| 100 | 124 | 164 | 182 | 117 |

⇒

Hamming weight = 1110011010 1000011001

Comparison method of vertical census transform

FIG. 6B

Comparison method of chain vertical census transform

STEREO MATCHING METHOD AND SYSTEM USING RECTANGULAR WINDOW

CROSS-REFERENCE TO RELATED APPLICATION(S)

This application claims the priority benefit of Korean Patent Application No. 10-2016-0148300 filed on Nov. 8, 2016, in the Korean Intellectual Property Office, the disclosure of which is incorporated herein by reference for all purposes.

BACKGROUND

1. Field

One or more example embodiments relate to stereo matching method and system based on a stereo vision, the method and system for generating a depth map by applying a rectangular window to a left image and a right image.

2. Description of Related Art

Stereo matching may be technology for acquiring three-dimensional (3D) information from two-dimensional (2D) images acquired at different positions at the same time using two image sensors. In the stereo matching, correspondence points corresponding to the same position in a left image and a right image may be detected to acquire a disparity between the correspondence points. Through this, a depth map corresponding to 3D distance information may be acquired.

The stereo matching may be classified into a feature-based method and an area-based method based on an element used for the stereo matching.

The feature-based method may be a matching method using a matching element, for example, a zero-crossing point, a boundary, an edge, a ridge, a groove, and a conic section. Since the feature-based method uses features extracted from an image to perform the matching, the feature-based method may not be significantly affected by a light source or a change in brightness of an image. Thus, the feature-based method may be relatively less affected by noise and have a simple calculation process.

The area-based method may be a matching method performed by determining one of a left image and a right image to be a reference image, determining a remaining one to be a search image, and detecting correspondence points in the search image with respect to all pixels of the reference image. Using the area-based method, in contrast to the feature-based method, a variation value may be obtained for the entire image without need to perform an interpolation or extract a feature. The area-based method may require a preprocessing process to remove noise due to a vulnerability to the noise.

SUMMARY

A process of acquiring a depth map in real time using a stereo matching system may require a high bandwidth memory because the process includes a process of searching a left image and a right image received from a stereo camera for identical points and calculating three-dimensional (3D) depth information or distance information. A large amount of memory usage may be an obstacle to implementing the stereo matching system. A memory for storing a left image and a right image from which a y-axis directional disparity is removed may require a greatest bandwidth. Therefore, an aspect provides a method and system for minimizing a memory usage for storing a left image and a right image from which a y-axis directional disparity is removed.

A matching accuracy may be a main factor of implementing a stereo matching system. As the matching accuracy increases, a stability of implementing the system may increase. To increase the matching accuracy, a lot of hardware resources such as a memory may be used, which may affect the implementation of the stereo matching system. Therefore, another aspect also provides a method and system for improving a performance of a stereo matching system by increasing a matching accuracy while using a minimized amount of hardware resources.

According to an aspect, there is provided a stereo matching method based on a stereo vision, the method including acquiring a left image and a right image, identifying image data by applying a window to each of the acquired left image and right image, storing the image data in a line buffer, extracting a disparity from the image data stored in the line buffer, and generating a depth map based on the extracted disparity, wherein the window is a rectangular window that has a same area as a square window and is determined to have a line buffer with a length less than a vertical length of a line buffer formed in the square window.

In the rectangular window, a memory usage for storing the left image and the right image may be minimized when a vertical length of the line buffer is reduced.

The line buffer of the rectangular window may have a horizontal length that is twice a vertical length.

The identifying of the image data may include identifying at least one pair of correspondence points at a same position in the acquired left image and right image, and applying the window based on the at least one pair of correspondence points.

The extracting of the disparity may include removing a y-axis directional disparity in the acquired left image and right image, and extracting an x-axis directional disparity in the left image and right image from which the y-axis directional disparity is removed.

The extracting of the x-axis directional disparity may include segmenting the window into columnar units and performing a chain type comparison operation on pixels included in each of windows segmented into columnar units, and extracting the x-axis directional disparity by accumulating the segmented windows on which the chain type comparison operation is performed.

According to another aspect, there is also provided a stereo matching system based on a stereo vision, the system including a stereo camera configured to capture a left image and a right image, a memory configured to store a plurality of line buffers, and a processor, wherein the processor is configured to acquire the left image and the right image using the stereo camera, identify image data by applying a window to each of the acquired left and right images, store the image data in a line buffer, extract a disparity from the image data stored in the line buffer, and generate a depth map based on the extracted disparity, and the window is a rectangular window that has a same area as a square window and is determined to have a line buffer with a length less than a vertical length of a line buffer formed in the square window.

In the rectangular window, a memory usage for storing the left image and the right image may be minimized when a vertical length of the line buffer is reduced.

The line buffer of the rectangular window may have a horizontal length that is twice a vertical length.

The processor may be configured to identify at least one pair of correspondence points at a same position in the acquired left image and right image, and apply the window based on the at least one pair of correspondence points.

The processor may be configured to remove a y-axis directional disparity in the acquired left image and right image, and extract an x-axis directional disparity in the left image and right image from which the y-axis directional disparity is removed.

The processor may be configured to segment the window into columnar units and perform a chain type comparison operation on pixels included in each of windows segmented into columnar units, and extract the x-axis directional disparity by accumulating the segmented windows on which the chain type comparison operation is performed.

The processor may include a preprocessor configured to rectify a y-axis directional disparity in the left image and the right images, a matcher configured to apply a preset size of window to the left image and the right image, and a postprocessor configured to generate a depth map based on image data output from the matcher.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
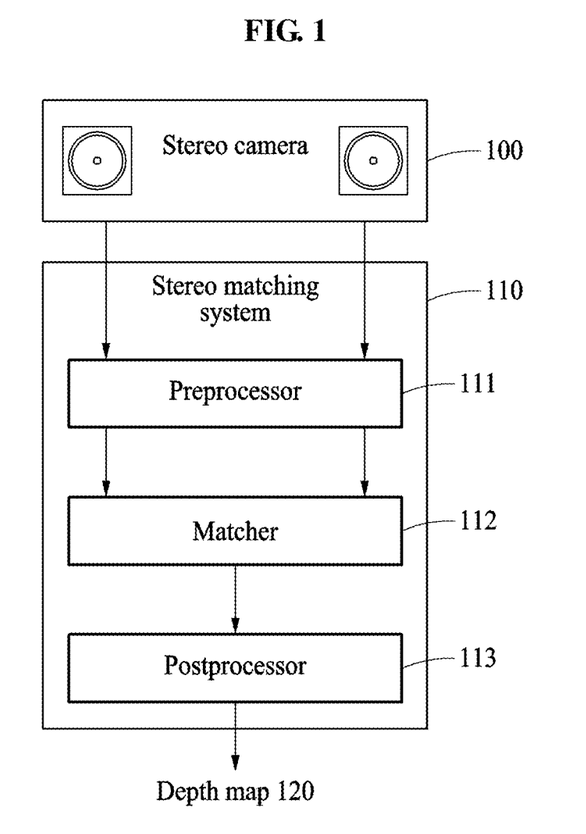
FIG. 1 is a diagram illustrating a process of acquiring a depth map using a stereo matching system according to an example embodiment.

FIG. 1 is a diagram illustrating a process of acquiring a depth map using a stereo matching system according to an example embodiment. A stereo matching system 110 may include a preprocessor 111, a matcher 112, or a postprocessor 113.

The stereo matching system 110 may receive a left image and a right image of a same point of view from a stereo camera 100 located on a plane. For example, the stereo camera 100 may include two optical units and be arranged such that centers of the optical units are level. One of the two optical units may be used to acquire the left image and the other may be used to acquire the right image.

The stereo camera 100 including the optical units may acquire the left image and the right image by simultaneously capturing the same object. A stereo camera (not shown) including a single optical unit may acquire the left image and the right image by capturing the same object at a predetermined time interval while the single optical unit is moving horizontally.

The preprocessor 111 may receive the left image and the right image acquired using the stereo camera 100. The preprocessor 111 may remove noise from the received left and right images and rectify the left image and the right image to align viewpoints of the left image and the right image. For example, the preprocessor 111 may perform an operation of removing a y-axis directional disparity from the left image and the right image.

In the present disclosure, a global matching and a local matching may be applied to extract a disparity between the left image and the right image. In the global matching, all information associated with the left image and the right image may be used and thus, a depth map 120 may be more accurately acquired while an algorithm for acquiring the depth map 120 is relatively complex and an amount of operations is relatively large. The local matching may include a window type area-based matching and a feature-based matching performed based on feature points included in an image. In the local matching, a process of operation may be simple and an amount of operations may be less than that of the global matching. Thus, using the local matching, the depth map 120 may be more efficiently acquired.

The window type area-based matching may be applied to extract the disparity between the left image and the right image. Also, a vertical census transform or a census transform robust to a change in illumination affecting an image may be used.

Figure 2A:
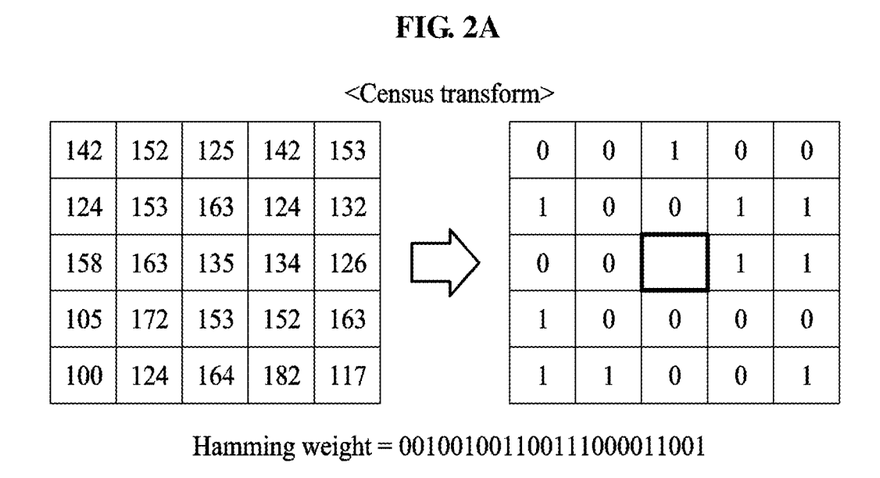
FIGS. 2A and 2B are diagrams illustrating methods of calculating a hamming weight for disparity estimation of a census transform and a vertical census transform according to an example embodiment.
Figure 2B:
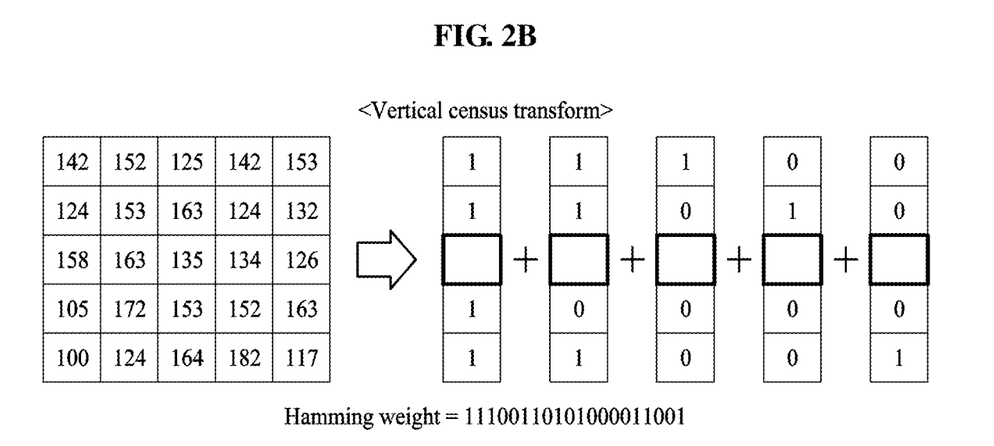

The matcher 112 may more efficiently extract the disparity between the left image and the right image using the vertical census transform, and related description will be provided with reference to FIGS. 2A and 2B.

The matcher 112 may determine one of the left image and the right image to be a reference image and determine a remaining image to be a search image. Thereafter, the matcher 112 may search the search image for a predetermined pixel or area of the reference image.

For example, the matcher 112 may receive the left image and right image from which the y-axis directional disparity is removed from the preprocessor 111. Also, the matcher 112 may set one of the received left image and right image to be the reference image and set a remaining image to be the search image. Thereafter, the matcher 112 may apply a window to the reference image, select a predetermined area, and search the search image for an area similar to the selected area. When an operation of matching the reference image and the search image is completed, the matcher 112 may extract the disparity between the left image and the right image.

The postprocessor 113 may generate the depth map 120 based on the disparity extracted in the matcher 112.

The stereo matching system may include a memory configured to store image data created in a process of acquiring a depth map and an intermediate result. The preprocessor 111 may include a memory configured to store the left image and the right image received from the stereo camera 100. The matcher 112 may include a memory configured to store the left image and right image from which the y-axis directional disparity is removed. Also, the postprocessor 113 may include a memory configured to store the depth map and the disparity extracted in the matcher 112.

FIGS. 2A and 2B are diagrams illustrating methods of calculating a hamming weight for disparity estimation of a census transform and a vertical census transform according to an example embodiment.

Referring to FIGS. 2A and 2B, a stereo matching system may extract a disparity between a left image and a right image using a census transform or a vertical census transform as described with reference to FIG. 1. Here, the census transform or the vertical census transform may be an algorithm for calculating a disparity between images.

The census transform may be a method of comparing a center pixel and remaining pixels in a window, calculating a hamming weight, and searching for the disparity based on the hamming weight. Also, the vertical census transform may be a method suggested to reduce a hardware usage of the census transform. The suggested method may compare a center pixel of each column to remaining pixels of the corresponding column instead of comparing the center pixel of the window to the remaining pixels of the window.

Also, the vertical census transform may not only reduce a number of pixel-to-pixel comparisons but may also reduce the hardware usage because a result of pixel-to-pixel comparison for each column may be used to set a subsequent window.

Thus, the stereo matching system may select a predetermined area by applying a window to a reference image, perform an operation of searching a search image for an area similar to the selected area, and simultaneously perform an operation by accumulating pixels for each column included in a window, thereby increasing a matching accuracy and reducing a usage. In this example, the window may be a rectangular window with a horizontal length greater than a vertical length and the horizontal length may be, for example, 2N×(N/2−1).

Figure 3:
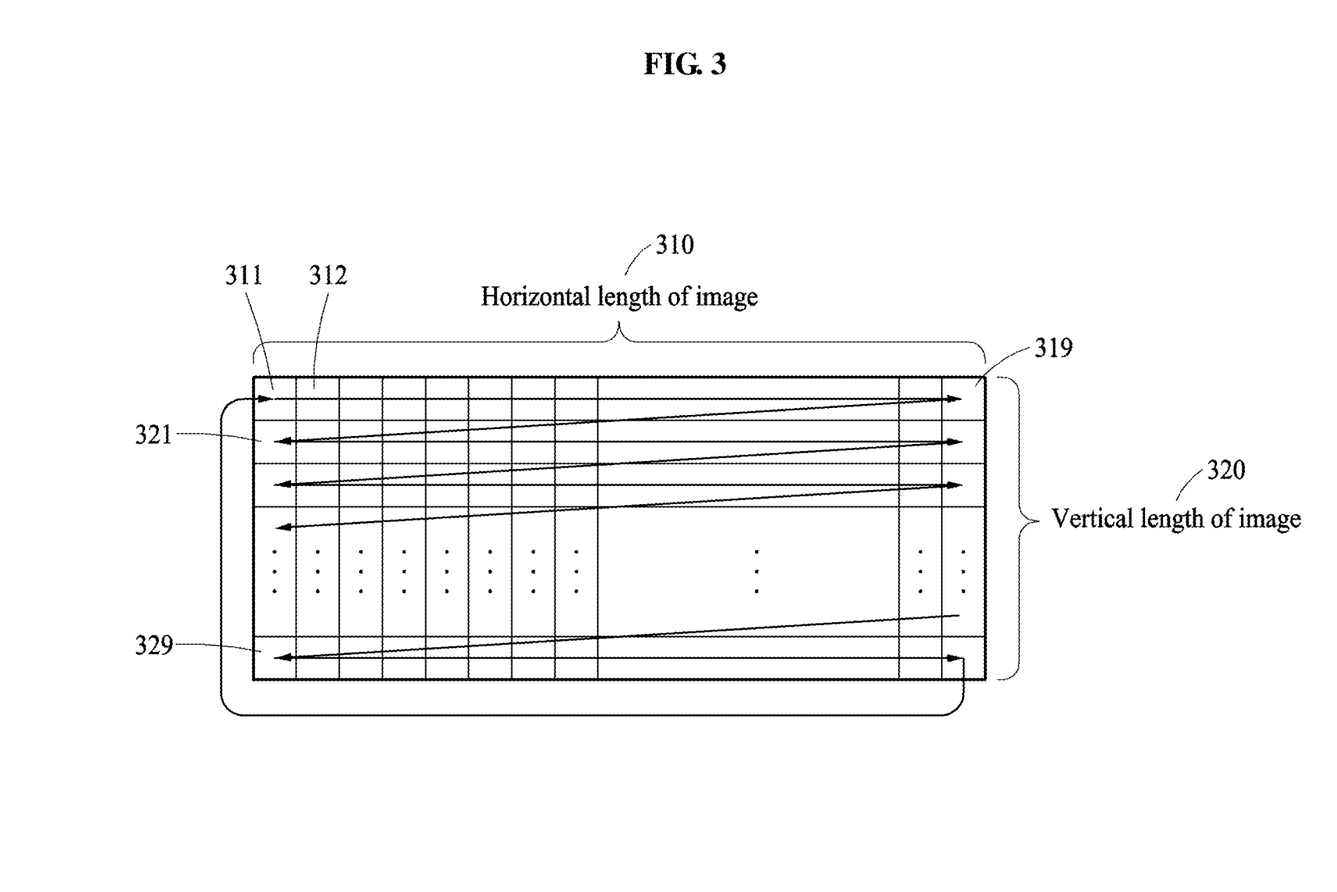
FIG. 3 is a diagram illustrating a method of storing image data in a memory according to an example embodiment.

FIG. 3 is a diagram illustrating a method of storing image data in a memory according to an example embodiment.

An image received from the stereo camera 100 may be stored in a memory included in a stereo matching system in a direction from a top and leftmost portion 311 of the memory. The storing may be performed on the top and leftmost portion 311 through a top and rightmost portion 319 of the memory in an x-axial direction. A storing operation performed by moving in an x-axial direction may be performed by moving a distance corresponding to a horizontal length 310 of the image to reach the top and rightmost portion 319 and performed on a portion 321 corresponding to coordinates (2, 1) of the memory. Using such method, when the storing is performed on a last portion of the memory and all image frames are stored, an image of a subsequent frame may be stored by moving to the top and leftmost portion 311 corresponding to an initial start point.

Figure 4:
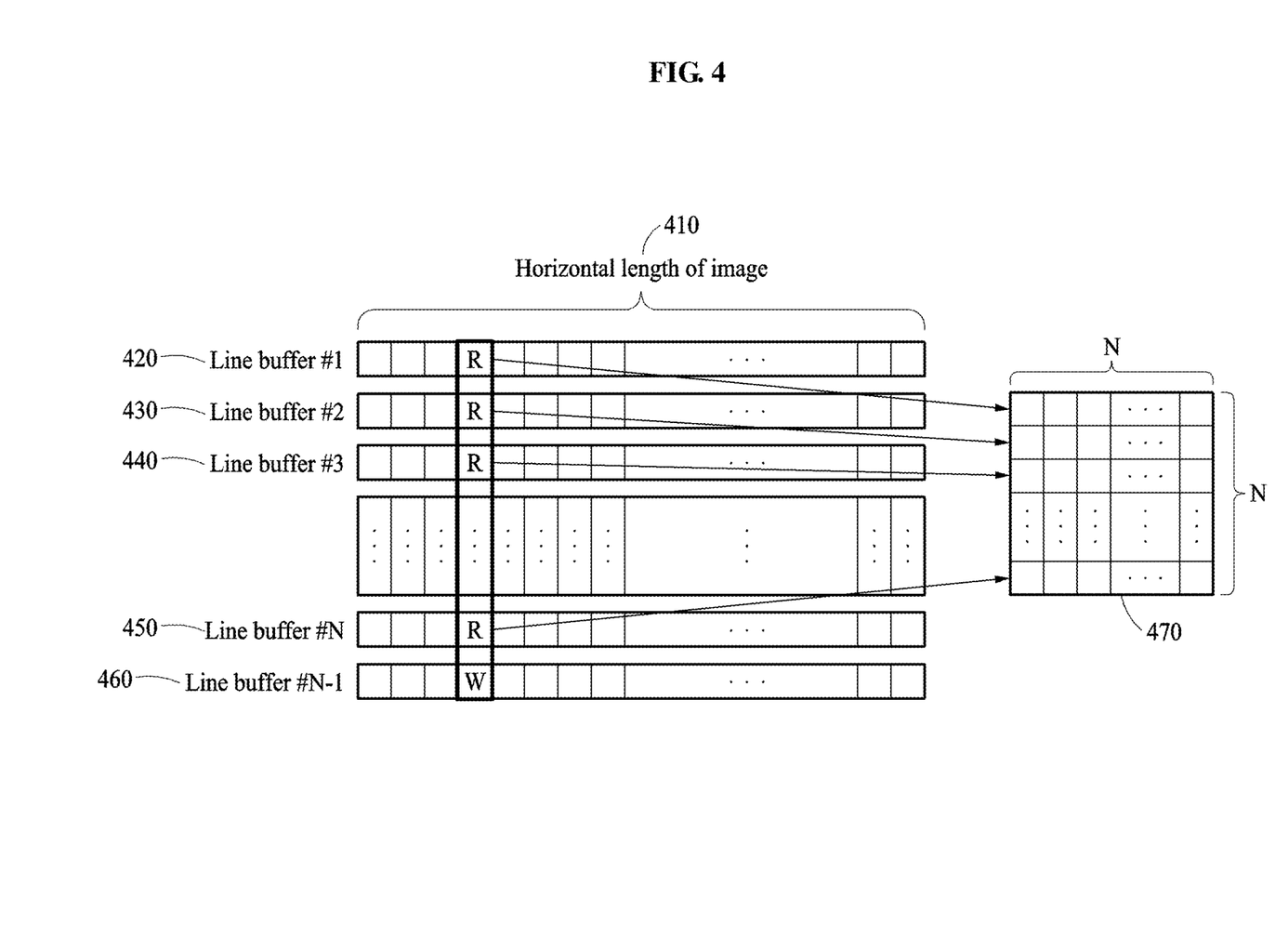
FIG. 4 is a diagram illustrating a method of reading and writing data using a single-port memory in a form of a plurality of line buffers according to an example embodiment.

FIG. 4 is a diagram illustrating a method of reading and writing data using a single-port memory in a form of a plurality of line buffers according to an example embodiment.

Image data may be stored using N+1 line buffers having an address value corresponding to a horizontal length 410 of an image. In this example, N may be a predetermined number less than a vertical length of an image frame.

An operation of storing the image data in a line buffer of a memory may be performed in a manner of reading image data received using a first line buffer 420 through an $N^{th}$ line buffer 450 and storing image data corresponding to an image frame in an $(N+1)^{th}$ line buffer 460.

A processor may sequentially store the image data in an order from a first address to a last address of the $(N+1)^{th}$ line buffer 460. After storing the image data in the last address of the $(N+1)^{th}$ line buffer 460, the process may move to the first address of the $(N+1)^{th}$ line buffer 460 to store the image data. Also, when a subsequent image frame is input, the process may store image data, starting from a first address of an $(N+1)^{th}$ line buffer.

When storing the image data using the N+1 line buffers, the processor may use one line buffer to store the image data and use N remaining line buffers to read the received image data. The process may perform an operation of storing image data and an operation of reading image data, simultaneously. Using such method, the processor may read N×N items of image data during N cycles and generate a window, for example, a window 470 in a size of N×N. In this example, a number of line buffers used to generate the window may be proportional to a vertical length of the window.

Thus, when the vertical length of the window is reduced, the number of line buffers may be correspondingly reduced. When a size of the window is reduced, an error occurring in a stereo matching result may increase. Accordingly, in the present disclosure, a method of minimizing the number of line buffers using a rectangular window having a horizontal length that is greater than a vertical length in addition to a square window is suggested.

Figure 5:
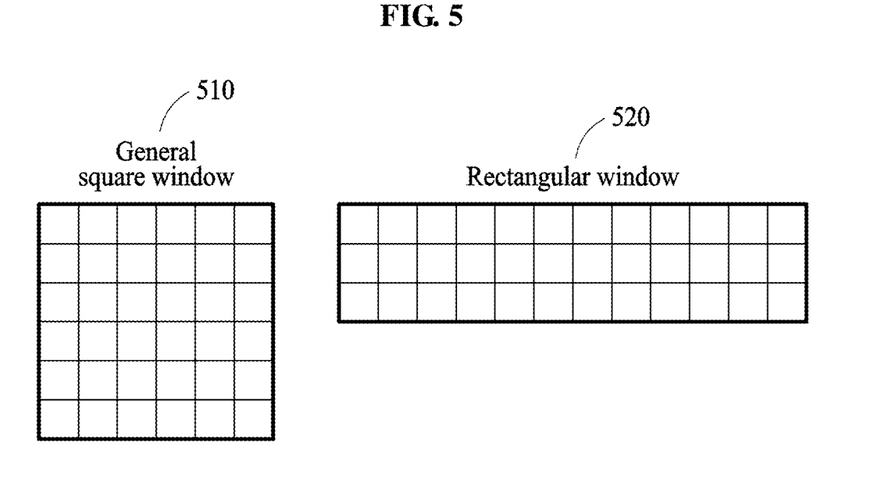
FIG. 5 is a diagram illustrating a square window and a rectangular window according to an example embodiment.

FIG. 5 is a diagram illustrating a square window and a rectangular window according to an example embodiment.

Referring to FIG. 5, a square window 510 may be a square of which each of a horizontal length and a vertical length are 6. The square window 510 may include 36 portions. A rectangular window 520 may be a rectangle of which a horizontal length is 12 and a vertical length is 3. The rectangular window 520 may include 36 portions.

The square window 510 and the rectangular window 520 may have different horizontal lengths and vertical lengths and may have a same area. Hereinafter, a method of applying the square window 510 and the rectangular window 520 will be described with reference to FIG. 5.

Figure 6A:
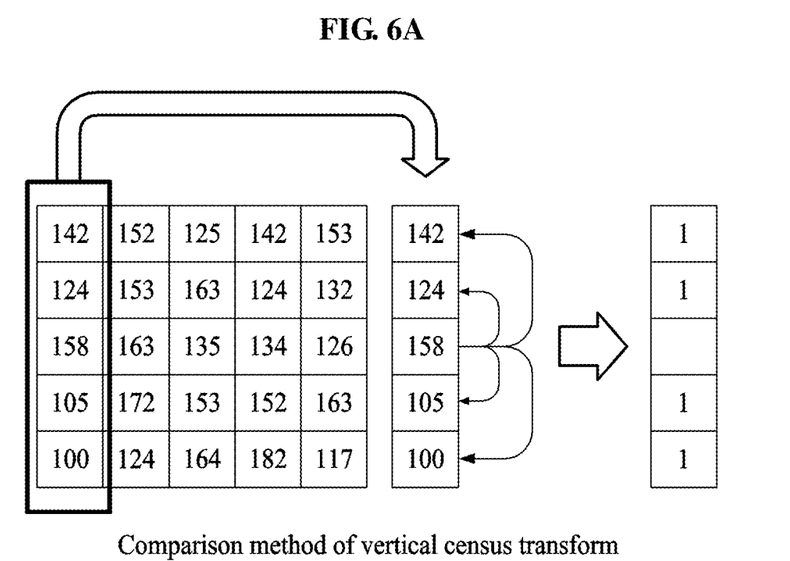
FIGS. 6A and 6B are diagrams illustrating a pixel-to-pixel comparison for calculating a hamming weight in each column of a vertical census transform and a chain vertical census transform according to an example embodiment.
Figure 6B:
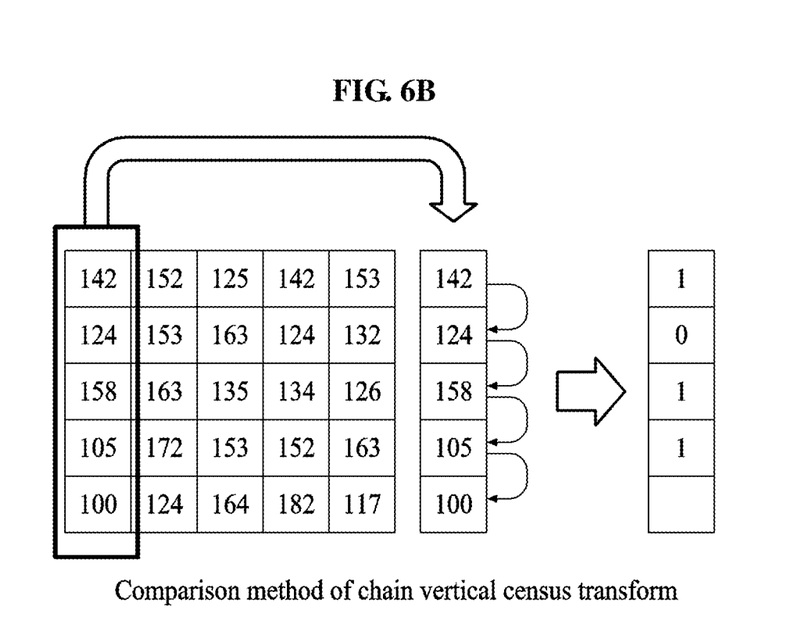

FIGS. 6A and 6B are diagrams illustrating a pixel-to-pixel comparison for calculating a hamming weight in each column of a vertical census transform and a chain vertical census transform according to an example embodiment.

In general, when an incorrect value is stored in a center pixel of each column or a window to be compared, an error may occur in a process of performing an area-based matching using a census transform or a vertical census transform. In this example, an error may occur in a process of calculating a hamming weight and thus, an incorrect disparity may be obtained.

To prevent this, a stereo matching system may calculate a hamming weight by comparing pixels of each column in a form of chain instead of comparing a center pixel to remaining pixels of a window applied to an image. The stereo matching system may be performed by comparing pixels of a window for each columnar unit. For example, the stereo matching may be performed by comparing pixels included in a window segmented into columnar units and accumulating operation results of the columnar units.

Referring to FIG. 6A, a stereo matching system may apply a rectangular window in units of columns in the vertical census transform. In this example, the rectangular window may have a horizontal length that is greater than a vertical length. Also, among pixels included in a window of each columnar unit, the stereo matching system may compare a center pixel to remaining pixels in a form of chain.

Referring to FIG. 6B, a stereo matching system may apply a rectangular window in units of columns in the vertical census transform. In this example, the rectangular window may have a horizontal length that is greater than a vertical length. The stereo matching system may perform a chain type comparison on pixels in an order from a pixel at a first ordinal position among pixels included in a window of each columnar unit. Also, the stereo matching system may accumulate operation results of the pixels of each columnar unit and obtain an operation result of a window set in units of column.

Accordingly, the stereo matching system may perform a cumulative operation on a columnar unit window by comparing pixels included in the columnar window of a reference image in a form of chain to calculate a disparity between a left image and a right image instead of performing an operation on each pixel included in a window applied to an image, thereby minimizing hardware resources used for the operation. Also, the stereo matching system may increase a matching accuracy based on an operation result accumulated for the columnar unit window.

The stereo matching system may minimize a memory usage for storing the image data using a horizontally long rectangular window with a horizontal length of 2N×(N/2−1) instead of an N×N square window in a process of the area-based stereo matching.

Figure 7:
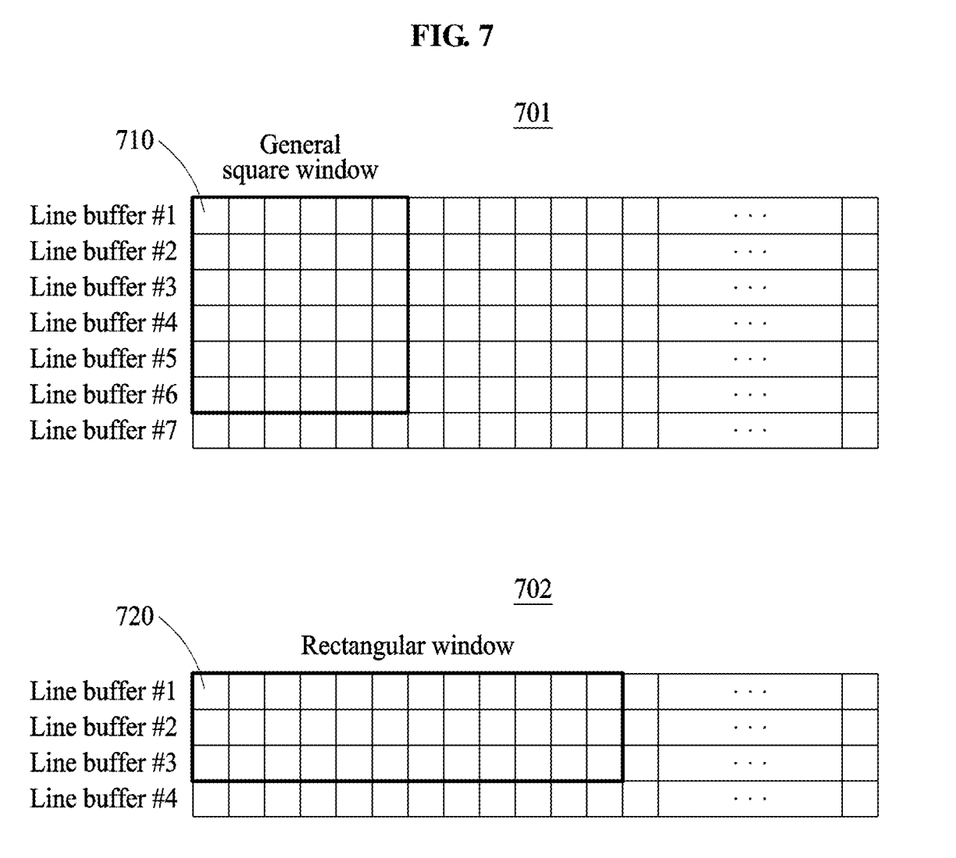
FIG. 7 is a diagram illustrating a number of line buffers required to apply a square window or a rectangular window according to an example embodiment.

FIG. 7 is a diagram illustrating a number of line buffers required to apply a square window or a rectangular window according to an example embodiment.

Referring to FIG. 7, a reference numeral 701 illustrates a process of performing a stereo matching by applying a square window 710 of which each of a horizontal length and a vertical length is 6. A number of line buffers allocated to a memory may be determined based on a vertical length of a window. For example, a minimum number of line buffers allocated to a memory may be determined to be 7 (=6+1) based on the vertical length, 6 of the square window.

The square window 710 may move from a first line buffer to a sixth line buffer in a direction from left to right. The matcher 112 may perform the stereo matching using the square window 710.

Referring to FIG. 7, a reference numeral 702 illustrates a process of performing a stereo matching by applying a rectangular window 720 of which a horizontal length is 12 and a vertical length is 3. A number of line buffers allocated to a memory may be determined based on a vertical length of a window. For example, a minimum number of line buffers allocated to a memory may be determined to be 4 (=3+1) based on the vertical length, 3 of the rectangular window.

The rectangular window 720 may move from a first line buffer to a third line buffer in a direction from left to right. The matcher 112 may perform the stereo matching using the rectangular window 720.

The rectangular window 720 may be formed to have a vertical length less than a vertical length of a line buffer formed by the square window 710. The matcher 112 may perform the stereo matching using the rectangular window 710 moving in the direction from the left to the right.

Also, in the example of FIG. 7, the square window 710 and the rectangular window 720 may have the same area of 36 and thus, may have the same number of items of image data configuring of the square window 710 and the rectangular window 720. Since the square window 710 and the rectangular window 720 have the same area, the number of items of image data stored through each of the square window 710 and the rectangular window 720 may be the same. As such, in the present disclosure, a rectangular window in a form of 2N×(N+1)/2 corresponding to a case in which an N×N square window is used may be used. The aforementioned window size may be for unifying a pixel-to-pixel comparison count in a process of stereo matching. In this example, the number of pixels included in a window may increase and a memory usage may be reduced because the number of line buffers is reduced. Also, since the pixel-to-pixel comparison count is the same, a matching result may have no or little difference.

Accordingly, error rates of the stereo matching performed with respect to the reference numerals 701 and 702 may be similar to each other. Also, since the number of line buffers used for the reference numeral 702 is smaller than the number of line buffers used for the reference numeral 701, a memory usage may be much smaller. When the size of the window is the same, instead of the square window, the rectangular window may be used to reduce the memory usage without degradation in an error rate that may occur in a process the stereo matching.

Figure 8:
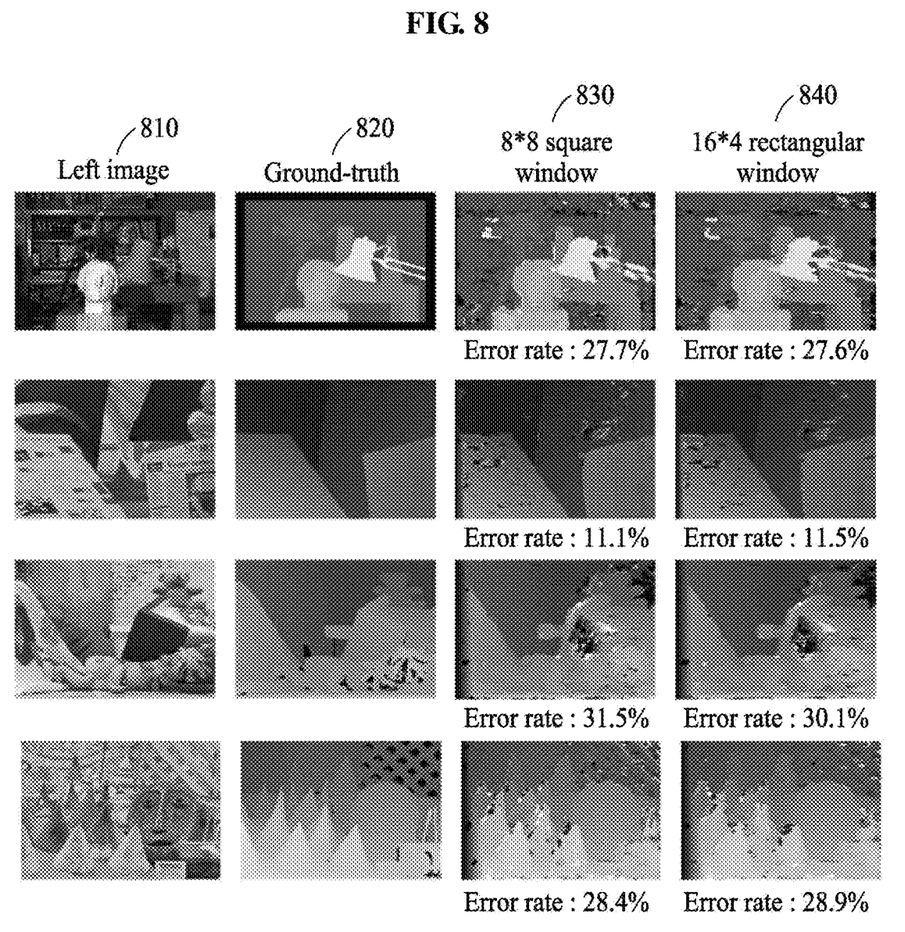
FIG. 8 is a diagram illustrating a result of stereo matching performed by applying a square window and a rectangular window according to an example embodiment.

FIG. 8 is a diagram illustrating a result of stereo matching performed by applying a square window and a rectangular window according to an example embodiment.

Referring to FIG. 8, an image 810 may be a left image of images acquired using the stereo camera 100. For example, the matcher 112 may determine the left image to be a reference image. A ground truth of an image 820 may be a ground truth with respect to the left image. The ground truth may be an actual value used as a reference of a comparison when an accuracy of a value, for example, a calculated value, an estimated value, and a predicted value is to be evaluated. The ground truth may also be a reference image used to evaluate a search image.

The matcher 112 may determine the image 820 to be the reference image, determine a right image to be the search image, and perform a stereo matching. As shown in an image 830, an error rate to be measured when the stereo matching is performed using a square window may be extracted. For example, when an error rate is extracted for the reference image and the search image by applying an 8×8 square window, error rates of 4 images may be measured as 27.7%, 11.1%, 31.5%, and 28.4%, respectively.

As shown in an image 840, an error rate to be measured when the stereo matching is performed using a rectangular window may be extracted. For example, when an error rate is extracted for the reference image and the search image by applying a 16×4 rectangular window, error rates of 4 images may be measured as 27.6%, 11.5%, 30.1%, and 28.9%, respectively.

When sizes of image data defined by windows are the same, matching results with similar error rates may be obtained irrespective of a type of window, for example, the square window or the rectangular window, being applied.

Figure 9:
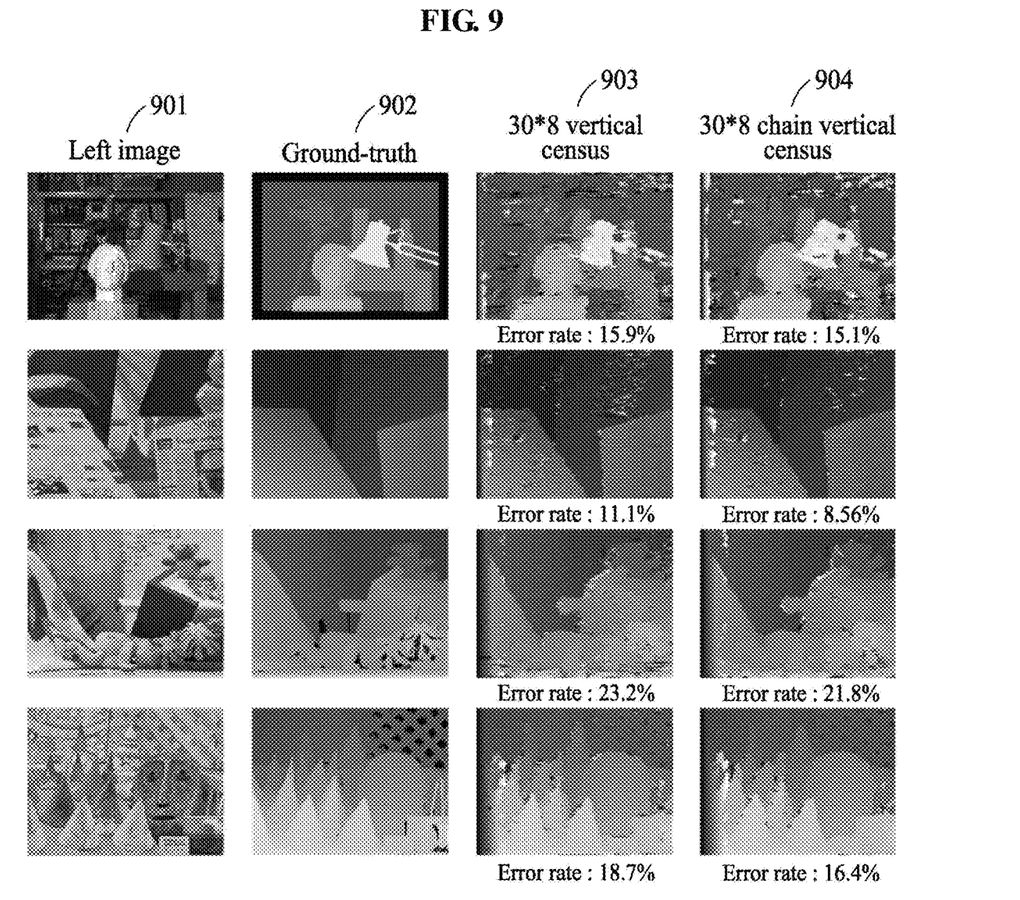
FIG. 9 is a diagram illustrating a result of stereo matching between a vertical census transform and a chain vertical census transform according to an example embodiment.

FIG. 9 is a diagram illustrating a result of stereo matching between a vertical census transform and a chain vertical census transform according to an example embodiment.

Referring to FIG. 9, an image 810 may be a left image of images acquired using the stereo camera 100. For example, the matcher 112 may determine the left image to be a reference image. A ground truth of an image 920 may be a ground truth with respect to the left image.

The matcher 112 may determine the image 920 to be the reference image, determine a right image to be the search image, and perform a stereo matching. As shown in an image 930, an error rate to be measured when the stereo matching is performed in units of column using a vertical census may be extracted. For example, when an error rate is extracted for the reference image and the search image by applying a 30×8 window, error rates of 4 images may be measured as 15.9%, 11.1%, 23.2%, and 18.7%, respectively.

As shown in an image 940, an error rate to be measured when the stereo matching is performed using a chain vertical census transform may be extracted. For example, when an error rate is extracted for the reference image and the search image by applying a 30×8 rectangular window, error rates of 4 images may be measured as 15.1%, 8.56%, 21.8%, and 16.4%, respectively.

In the example of FIG. 9, when comparing a matching result of the vertical census transform to a matching result of the chain vertical census transform, the matching result of the chain vertical census transform may be higher than the matching result of the vertical census transform.

Figure 10:
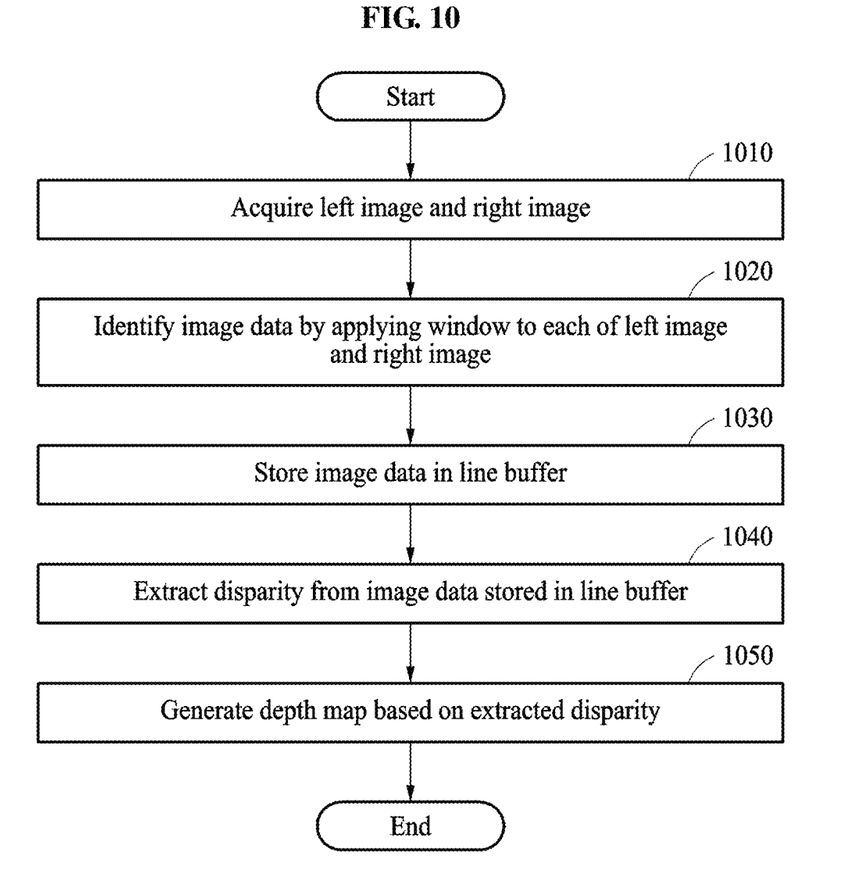
FIG. 10 is a flowchart illustrating a stereo vision based stereo matching method according to an example embodiment.

FIG. 10 is a flowchart illustrating a stereo vision based stereo matching method according to an example embodiment.

In operation 1010, a stereo matching system may acquire a left image and a right image. For example, the stereo matching system may receive a left image and a right image captured using a stereo camera.

In operation 1020, the stereo matching system may identify image data by applying a window to each of the left image and the right image. To identify the image data, the stereo matching system may determine one of the left image and the right image to be a reference image and determine a remaining image to be a search image. For example, the stereo matching system may determine the left image to be the reference image and determine the right image to be the search image. The stereo matching system may search for correspondence points corresponding to each other by applying a window to the reference image and the search image.

In operation 1030, the stereo matching system may store the image data in a line buffer. For example, when storing the image data using N+1 line buffers, the stereo matching system may use one line buffer to store the image data and use N remaining line buffers to read received image data. A processor may perform an operation of storing image data and an operation of reading image data, simultaneously.

In operation 1040, the stereo matching system may extract a disparity from the image data stored in the line buffer. For example, the stereo matching system may extract a disparity of both images based on a matching result of the reference image and the search image.

In operation 1050, the stereo matching system may generate a depth map based on the extracted disparity. The depth map may be an image acquired based on a distance value extracted from a plurality of two-dimensional images of a predetermined object or background. For example, the stereo matching system may generate an image representing a distance value of a background or an object included in a left image and a right image using the disparity extracted in operation 740.

In the present disclosure, a memory usage may be minimized by using a rectangular window with a vertical length less than that of a line buffer of a square window. Also, using a rectangular window with the same area as a line buffer of a square window, an accuracy of an error that may occur in a stereo matching process may be maintained. Accordingly, when performing a stereo matching on image data, using the rectangular window that has the same area as the square window and minimizes the memory usage based on a number of line buffers, an accuracy of a disparity extracted from a left image and a right image may be maintained and a depth map may be generated based on the disparity.

According to an aspect, it is possible to reduce a number of line buffers for storing image data identified from a left image and a right image, from N+1 to N/2+1.

According to another aspect, it is possible to reduce a memory usage without degradation in accuracy of a disparity when extracting the disparity from a left image and a right image.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A stereo matching method based on a stereo vision, the method comprising:
   acquiring a left image and a right image;
   identifying image data by applying a window to each of the acquired left image and right image;
   storing the image data in a line buffer;
   extracting a disparity from the image data stored in the line buffer; and
   generating a depth map based on the extracted disparity,
   wherein the depth map is generated based on the image data identified by applying the window which is a rectangular window that has a same area as a square window and is determined to have a line buffer with a length less than a vertical length of a line buffer formed in the square window.

2. The stereo matching method of claim 1, wherein, in the rectangular window, a memory usage for storing the left image and the right image is minimized when a vertical length of the line buffer is reduced.

3. The stereo matching method of claim 1, wherein the line buffer of the rectangular window has a horizontal length that is twice a vertical length.

4. The stereo matching method of claim 1, wherein the identifying of the image data comprises:
   identifying at least one pair of correspondence points at a same position in the acquired left image and right image; and
   applying the window based on the at least one pair of correspondence points.

5. The stereo matching method of claim 1, wherein the extracting of the disparity comprises:
   removing a y-axis directional disparity in the acquired left image and right image; and
   extracting an x-axis directional disparity in the left image and right image from which the y-axis directional disparity is removed.

6. The stereo matching method of claim 5, wherein the extracting of the x-axis directional disparity comprises:
   segmenting the window into columnar units and performing a chain type comparison operation on pixels included in each of windows segmented into columnar units; and
   extracting the x-axis directional disparity by accumulating the segmented windows on which the chain type comparison operation is performed.

7. A stereo matching system based on a stereo vision, the system comprising:
   a stereo camera configured to capture a left image and a right image;
   a memory configured to store a plurality of line buffers; and
   a processor configured to:
      acquire the left image and the right image using the stereo camera;
      identify image data by applying a window to each of the acquired left and right images;
      store the image data in a line buffer;
      extract a disparity from the image data stored in the line buffer; and
      generate a depth map based on the extracted disparity, and
      wherein the depth map is generated based on the image data identified by applying the window which is a rectangular window that has a same area as a square window and is determined to have a line buffer with a length less than a vertical length of a line buffer formed in the square window.

8. The stereo matching system of claim 7, wherein, in the rectangular window, a memory usage for storing the left image and the right image is minimized when a vertical length of the line buffer is reduced.

9. The stereo matching system of claim 7, wherein the line buffer of the rectangular window has a horizontal length that is twice a vertical length.

10. The stereo matching system of claim 7, wherein the processor is configured to identify at least one pair of correspondence points at a same position in the acquired left image and right image, and apply the window based on the at least one pair of correspondence points.

11. The stereo matching system of claim 7, wherein the processor is configured to remove a y-axis directional disparity in the acquired left image and right image, and extract an x-axis directional disparity in the left image and right image from which the y-axis directional disparity is removed.

12. The stereo matching system of claim 11, wherein the processor is configured to segment the window into columnar units and perform a chain type comparison operation on pixels included in each of windows segmented into columnar units, and extract the x-axis directional disparity by accumulating the segmented windows on which the chain type comparison operation is performed.

13. The stereo matching system of claim 7, wherein the processor comprises:
   a preprocessor configured to rectify a y-axis directional disparity in the left image and the right images;
   a matcher configured to apply a preset size of window to the left image and the right image; and a postprocessor configured to generate a depth map based on image data output from the matcher.

\* \* \* \* \*